United States Patent Office 2,748,143
Patented May 29, 1956

2,748,143

N,N-DI FATTY PYRROLIDINIUM HALIDES

John G. Erickson, Minneapolis, Minn., assignor to General Mills, Inc., a corporation of Delaware No Drawing. Application March 28, 1952,
Serial No. 279,252

6 Claims. (Cl. 260—313)

The present invention relates to novel compounds having the following formula

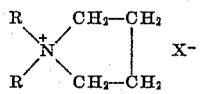

where R is an aliphatic hydrocarbon group containing from 8 to 22 carbon atoms, and X is halogen (chlorine, bromine, or iodine).

These compounds have unusual properties in that they react with bentonite to yield products which gel hydrocarbons. The hydrocarbon gels thus formed may be used as greases.

It is therefore an object of the present invention to provide novel compounds having the above formula.

It is another object of the present invention to provide a novel process of producing such compounds.

The compounds may be prepared by the reaction of secondary fatty amines with 1,4-dihalogenbutanes. The reaction is indicated as follows, with 1,4-dichlorobutane:

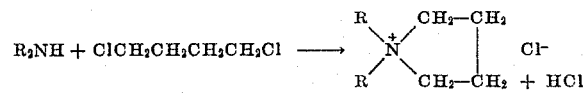

The fatty amines which are employed in the present invention may be derived from fatty acids and accordingly may be a mixture of the amines derived from fatty acids of a fat or oil, or may be the amines derived from a selected fraction of such fatty acids of a fat or oil, or may be an isolated single fatty acid. The fatty acids which may be employed for the preparation of amines may be saturated or unsaturated, and accordingly the amines may be saturated or unsaturated. In addition, the amines may contain hydrocarbon groups which are alike or different.

The reaction between the secondary fatty amine and 1,4-dihalogen compound may be carried out by simply heating the reagents together. It this is done, however, 1 mol of amine is used up in neutralizing the hydrogen halide liberated as 1 mol of pyrrolidinium chloride is formed. It is preferred, therefore, to use an inorganic base and thereby avoid the necessity of recovering secondary amine from its hydrohalide salt. Such inorganic bases include alkali metal hydroxides and carbonates.

While the reaction may be carried out in the absence of a solvent, it is desirable to use a solvent such as lower aliphatic alcohols, when reacting secondary fatty amines with 1,4-dihalogenbutanes in the presence of inorganic bases. The use of the solvent facilitates contact between the amine hydrohalide and the inorganic base and thus the regeneration of the amine is facilitated. A convenient method of carrying out the reaction is to reflux the alcoholic mixture of the reagents. By proper choice of alcohol a sufficiently high reflux temperature will be attained. N-butyl alcohol is very satisfactory for the purpose. At its reflux temperature (115–118° C.) the reaction proceeds to a satisfactory extent in 8 to 10 hours. The reaction is, of course, more rapid at higher temperatures. With lower boiling alcohols, such as methyl, ethyl and propyl, or with other solvents, it may be desirable to operate the process under superatmospheric pressure in order to get a satisfactory elevated temperature. While in the following examples 1,4-dichlorobutane is employed, since it is most readily available, the reaction likewise may be carried out with 1,4-dibromobutane or 1,4-diiodobutane. The bromo and iodo compounds react just as easily but are more expensive.

Example 1

A mixture of 35.3 parts of didodecylamine, 19 parts of 1,4-dichlorobutane, 15.9 parts of sodium carbonate and 162 parts of n-butyl alcohol was stirred and heated to reflux for 17 hours. It was then filtered. The alcohol was distilled from the filtrate. The residue was dissolved in acetonitrile and filtered. The filtrate was evaporated; the residue was purified by recrystallization from ethyl acetate and a low-boiling paraffin. This gave N,N-didodecylpyrrolidinum chloride as a white solid.

Example 2

A mixture of 61 parts of dioctadecylamine, 19 parts of 1,4-dichlorobutane, 15.9 parts of sodium carbonate and 243 parts of n-butyl alcohol was stirred and heated to reflux for 6½ hours. It was then filtered, cooled, and filtered again to remove unreacted amine. The filtrate was evaporated to dryness. Recrystallization of the residue from ethyl acetate gave N,N-dioctadecylpyrrolidinium chloride, a white solid, melting at 159–161.5° C.

A solution of 6.3 parts of N,N-dioctadecylpyrrolidinium chloride in 40 parts of isopropyl alcohol was added to 1000 parts of a centrifuged dispersion of bentonite containing 10 parts of solids. A floc formed immediately and was filtered off and washed with water and alcohol. This reaction product of bentonite and the pyrrolidinium chloride, when dried, was used to gel hydrocarbons. A small amount of it, when stirred with toluene, converted it to a grease-like gell. A portion of this bentonite-pyrrolidinium chloride product was mixed with heavy mineral oil and passed several times through a three-roll paint mill. A mixture formed in this way, containing 10% solids, was a thick grease.

I claim as my invention:

1. Compounds having the following formula

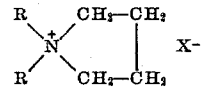

in which the R groups are aliphatic hydrocarbon groups containing from 8 to 22 carbon atoms, and X is halogen.

2. Compounds having the following formula

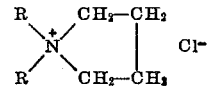

in which the R groups are aliphatic hydrocarbon groups containing from 8 to 22 carbon atoms.

3. N,N-didodecylpyrrolidinium chloride.
4. N,N-dioctadecylpyrrolidinium chloride.
5. Process of producing compounds having the following formula

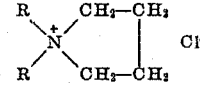

in which the R groups are aliphatic hydrocarbon groups containing from 8 to 22 carbon atoms, which comprises reacting the secondary fatty amine, R₂NH, with 1,4-dichlorobutane in the presence of n-butyl alcohol at approximately 115–118° C. for 8 to 10 hours.

6. Process of preparing compounds having the following formula

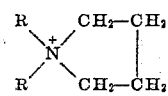

in which the R groups are aliphatic hydrocarbon groups containing from 8 to 22 carbon atoms, which comprises reacting the secondary fatty amine, $R_2NH$, with a 1,4-dichlorobutane in the presence of a low aliphatic alcohol at approximately reflux temperature.

References Cited in the file of this patent

FOREIGN PATENTS 805,521 Germany _____ May 21, 1951

OTHER REFERENCES

Beilstein: 1st Supp., vol. 20, page 4 (1935).

Chem. Abst., vol. 5, 3057[b] citing Breslau, Berichte, vol. 44, pp. 1252–60.

Chem. Abst., vol. 22, 385[7] citing Keil Z. Physical Chem., vol. 171, pp. 242–51 (1927).

Morton: The Chem. of Heterocyclic Compounds (1946), pp. 231–32.